United States Patent [19]

Whalley

[11] Patent Number: 4,972,261

[45] Date of Patent: Nov. 20, 1990

[54] MOTION COMPENSATION IMAGE SIGNAL ENCODING SYSTEM

[75] Inventor: Jonathan Whalley, Wembley, England

[73] Assignee: The General Electric Company, p.l.c., England

[21] Appl. No.: 235,938

[22] Filed: Aug. 23, 1988

[30] Foreign Application Priority Data

Aug. 28, 1987 [GB] United Kingdom ............... 8720345
Feb. 17, 1988 [GB] United Kingdom ............... 8803643

[51] Int. Cl.⁵ .......................... H04N 7/12; H04N 7/18
[52] U.S. Cl. .................................... 350/136; 350/135; 350/133; 350/105
[58] Field of Search ............... 358/133, 135, 136, 105

[56] References Cited

U.S. PATENT DOCUMENTS

| 4,125,873 | 11/1978 | Chesarek | 358/133 |
| 4,591,909 | 5/1986 | Kuroda et al. | 358/136 |
| 4,683,494 | 7/1987 | Furukawa et al. | 358/136 |
| 4,689,673 | 8/1987 | Ohki et al. | 358/136 |
| 4,710,810 | 12/1987 | Koja | 358/133 |
| 4,731,664 | 3/1988 | Nishiwaki et al. | 358/133 |
| 4,789,893 | 12/1988 | Weston | 358/136 |

Primary Examiner—John K. Peng
Attorney, Agent, or Firm—Kirschstein, Ottinger, Isreal & Schiffmiller

[57] ABSTRACT

In a video signal coder/decoder arrangement or codec for an image transmission system motion of picture elements between frames is encoded with reference to any one of eight preceding frames, so that picture information which repeats within eight frames does not need to be encoded again, and recovery after errors in transmission can commence with reference to the last-received uncorrupted frame of the eight.

4 Claims, 1 Drawing Sheet

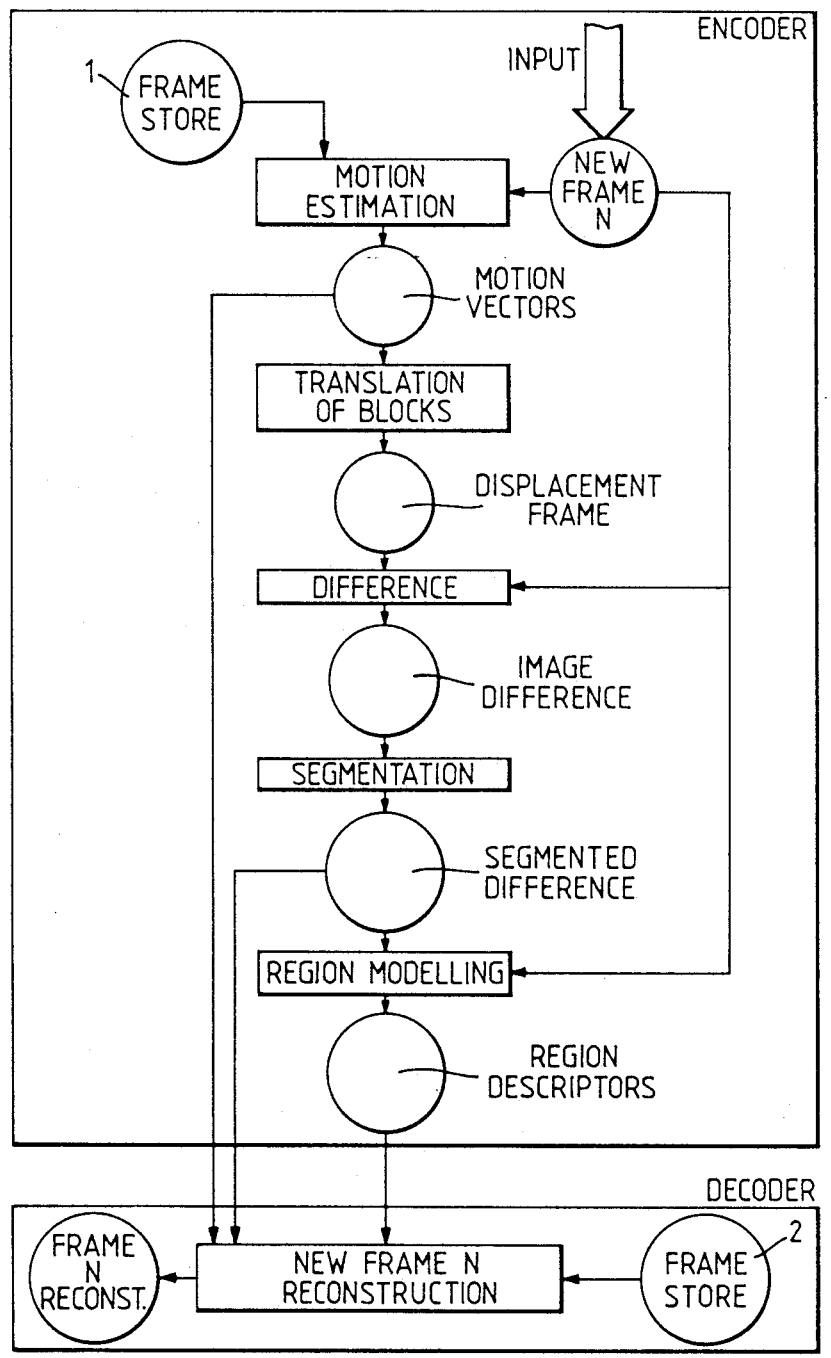

MOTION COMPENSATION IMAGE SIGNAL ENCODING SYSTEM

BACKGROUND OF THE INVENTION

1. Field of the Invention

The present invention relates to image transmission systems, and to methods of coding and decoding video signals for such systems.

2. Description of Related Art

Image transmission systems for video conferencing and video telephony are required to convey image information at low bit rates, typically at 64 kbit/sec. The image information transmitted over such systems must enable acceptable resolution of image detail and frequency of up-dating at a receiver, and for this purpose images to be transmitted may be presented for encoding as a succession of image frames, each made up of 288 lines of 360 pixels or pels, at a rate of ten frames per second. If the brightness and colour of each of these pixels is to be rendered at all accurately, full encoding of such a succession of image frames would give rise to a data rate of 10 Mbit/sec or more, and clearly only a very small proportion of this data could be transmitted over a 64 Kbit/sec channel.

Reduction of the data rate may be achieved by exploiting spatial redundancy within individual frames and temporal redundancy between successive frames. One way of taking advantage of temporal redundancy is to decompose each current frame into blocks of 8×8 pixels and, in respect of each such block, to look for a similar block in a portion of the succeeding frame in a "search window" of, say, ±7 pixels centred on the block under examination, in order to identify any movement of image elements between frames. A motion vector mapping each block to the similar block in the succeeding frame can then be associated with each block. Following this scheme it is possible to reconstruct the succeeding frame by translating blocks from the current frame according to the associated motion vectors. This technique is described, for example, by S. Kappagantula and K. R. Rao in IEEE Transactions on Communications, Volume Comm-33, No. 9, September 1985, pages 1011 to 1015.

SUMMARY OF THE INVENTION

According to one aspect of the present invention in a method of digitally encoding video signals motion of picture elements between frames is encoded with reference to one or more of a plurality of preceding frames.

According to another aspect of the present invention in an image transmission system motion of picture elements between frames is arranged to be represented in encoded signals for transmission with reference to one or more of a plurality of preceding frames, such that when picture information repeats within the time interval represented by said plurality of frames that information does not have to be encoded again.

In an existing strategy for recovery of picture information, when the transmission error rate has exceeded a given threshold, typically consists of the decoder flagging the coder to recommence transmission, with the first new frame coded in Intra mode. The decoder holds the last error-free frame until the new frame has been received and decoded. For this recovery strategy to operate with acceptable subjective picture quality the bit error rate of the channel must be low.

Where the data rate is low, for example due to limitations on the data channel, this existing error recovery strategy has disadvantages, since a single frame coded in Intra mode is subjectively poor compared with frames coded in Inter mode. Combined with a low frame rate this gives poor sequence reconstruction during error recovery.

According to another spect of the present invention in an image transmission system in which picture elements in a frame to be transmitted are encoded with reference to one or more of a plurality of preceding frames, recovery of picture after errors in transmission is carried out with reference to one or more of the said plurality of previous frames.

According to another aspect of the present invention in an image transmission system in which changes of picture information between frames are arranged to be represented in encoded signals by reference to one or more of a plurality of preceding frames, there are provided means to recover picture information after errors in transmission by coding a fresh frame with reference to one or more of said plurality of preceding frames.

BRIEF DESCRIPTION OF THE DRAWING

An image transmission system in accordance with the present invention will now be described by way of example with reference to the accompanying drawing, which illustrates the operation of the system schematically.

Existing designs of coder/decoder arrangements achieve economy of coding by encoding the differences between successive frames of picture information, and to reduce the difference signal further any motion of picture elements which is detected between successive frames is represented by "side information" in the form of motion vectors. Each frame is divided into sub-blocks of, say 8×8 pels and a search is made for the best matched sub-block in the preceding frame within a search window of, say 22×22 pels. The best matched sub-block then gives an indication of any movement from frame to frame.

In the present arrangement a search is made for the best matched sub-block in any of the eight preceding frames, held in a store 1. This extended search gives two advantages. Firstly, any element of picture information in the present frame which is a repeat of an element in any of the preceding eight frames can be coded more efficiently. For example, an element in the present frame may have been present four frames back but not in any of the intervening frames, and can simply be recovered during the decoding process from the fourth frame back rather than requiring to be encoded again. Secondly, motions of a fraction of a pel can also be coded more efficiently, since if there is motion at a speed of half a pel per frame the picture information for the present frame will have been present two frames back even though it was not in the immediately preceding frame. Thus previously inaccessible picture information can be encoded and utilised to enhance the picture on decoding, or the encoding can be carried out more efficiently to keep the data rate within acceptable limits.

The motion vector information in the present arrangement is three-dimensional, in that it has horizontal, vertical and temporal components, for the addition of three bits worth of temporal information (indicating 1 out of 8 frames), the amount of information that is required to be transmitted can be significantly reduced if a good match for a block of pels can be found in any one of the eight preceding frames. The search strategy used is that of a logarithmic (3-step) search in each of the eight frames followed by a decision on the best match from each frame. The correlation measure for sub-block matching is the Mean Absolute Error (MAE).

For error recovery at a receiver the decoder flags the coder to indicate which frame was lost and the coder then determines which if any of the previous frames, held in a store 2, it can use for recovery. The number of previous frames it can use depends on the loop delay, which itself depends upon the transmission path delay and the coder and decoder hardware and software delays. The greater the loop delay the greater the number of frames which will have been lost at the decoder.

Quantitative signal to noise gains are obtained and subjective improvements are obtained, particularly for mouth and arm movements.

I claim:

1. An image transmission system in which picture information in respect of a succession of frames is arranged to be digitally encoded for transmission, comprising: at a receiver station of the system, means for storing picture information in respect of a plurality of said frames, and decoder means for decoding received encoded picture information with reference to at least one of said plurality of frames.

2. An image transmission system in which picture information in respect of a succession of frames each comprising an array of pixels is arranged to be digitally encoded for transmission, comprising: at a transmitter station of the system, first store means for storing picture information in respect of a plurality of said frames and means for encoding for transmission picture information in respect of any one frame with reference to at least one of a plurality of preceding frames held in said first store means; and at a receiver station of the system, second store means for storing picture information in respect of a plurality of said frames and decoder means for decoding received encoded picture information with reference to at least one of a plurality of preceding frames held in said second store means.

3. An image transmission system according to claim 1, wherein recovery of picture after errors in transmission is carried out with reference to at least one of said plurality of preceding frames.

4. An image transmission system according to claim 2; and further comprising means for recovering picture information after errors in transmission by coding a fresh frame with reference to at least one of said plurality of preceding frames.

* * * * *